US009799170B2

(12) United States Patent
Irwin, Jr.

(10) Patent No.: US 9,799,170 B2
(45) Date of Patent: Oct. 24, 2017

(54) METHOD AND SYSTEM FOR PROVIDING ALTERNATIVE USAGES OF CLOSED LOTTERY NETWORKS

(71) Applicant: Scientific Games International, Inc., Newark, DE (US)

(72) Inventor: Kenneth Earl Irwin, Jr., Dawsonville, GA (US)

(73) Assignee: Scientific Games International, Inc., Newark, DE (US)

( * ) Notice: Subject to any disclaimer, the term of this patent is extended or adjusted under 35 U.S.C. 154(b) by 133 days.

(21) Appl. No.: 14/800,832

(22) Filed: Jul. 16, 2015

(65) Prior Publication Data
US 2016/0035177 A1    Feb. 4, 2016

Related U.S. Application Data

(60) Provisional application No. 62/030,283, filed on Jul. 29, 2014.

(51) Int. Cl.
| | | |
|---|---|---|
| *G07F 17/32* | (2006.01) | |
| *G06Q 10/00* | (2012.01) | |
| *G06Q 30/00* | (2012.01) | |

(52) U.S. Cl.
CPC ........... *G07F 17/329* (2013.01); *G06Q 10/00* (2013.01); *G06Q 30/00* (2013.01); *G07F 17/3251* (2013.01)

(58) Field of Classification Search
CPC ...................................................... G07F 17/32
See application file for complete search history.

(56) References Cited

U.S. PATENT DOCUMENTS

| | | |
|---|---|---|
| 4,344,135 A | 8/1982 | Crane et al. |
| 4,752,965 A | 6/1988 | Dunkley |
| | (Continued) | |

FOREIGN PATENT DOCUMENTS

| | | |
|---|---|---|
| CN | 1 387 171 | 12/2002 |
| WO | WO 2005/036485 A1 | 4/2005 |
| | (Continued) | |

OTHER PUBLICATIONS

Leelasantitham, "A System for Checking Code Numbers Between on a Credit Card and a Paper of Personal Information", 2009, IEEE, The International Conference on Computer Technology and Development, pp. 455-458.

(Continued)

*Primary Examiner* — Omkar Deodhar
(74) *Attorney, Agent, or Firm* — Dority & Manning, P.A.

(57) ABSTRACT

A method for processing lottery transactions and debit/credit transactions with lottery terminals that communicate with a lottery central site over a closed lottery network includes conducting lottery transactions at the lottery terminals and transmitting lottery transaction data between the lottery terminals and the lottery central site. An interface is configured between the lottery central site and an acquiring processor that is external to the closed lottery network. Debit/credit purchase transactions are conducted at the lottery terminals and debit/credit purchase transaction data is transmitted from the lottery terminals through the closed lottery network to the lottery central site, and from the lottery central site to the acquiring processor via the interface. The debit/credit purchase transaction data and lottery purchase transaction data are isolated throughout the closed lottery network.

10 Claims, 6 Drawing Sheets

(56) References Cited

U.S. PATENT DOCUMENTS

| | | | |
|---|---|---|---|
| 4,850,009 | A | 7/1989 | Zook et al. |
| 5,138,140 | A | 8/1992 | Siemiatkowski et al. |
| 5,150,420 | A | 9/1992 | Haraguchi |
| 5,191,525 | A | 3/1993 | LeBrun et al. |
| 5,321,751 | A | 6/1994 | Ray et al. |
| 5,337,358 | A | 8/1994 | Axelrod et al. |
| 5,455,406 | A | 10/1995 | Terashima et al. |
| 5,631,984 | A | 5/1997 | Graf et al. |
| 5,767,496 | A | 6/1998 | Swartz et al. |
| 6,014,454 | A | 1/2000 | Kunkler |
| 6,267,670 | B1 | 7/2001 | Walker et al. |
| 6,687,346 | B1 | 2/2004 | Swartz et al. |
| 6,853,984 | B1 | 2/2005 | Wilkes |
| 6,877,032 | B1 | 4/2005 | Philyaw |
| 7,143,942 | B2 | 12/2006 | Yamanaka et al. |
| 7,811,172 | B2 | 10/2010 | Asher et al. |
| 8,328,094 | B2 | 12/2012 | Proud et al. |
| 8,452,689 | B1 | 5/2013 | Medina, III |
| 2006/0052153 | A1* | 3/2006 | Vlazny .................. G06Q 20/06 463/17 |
| 2008/0153583 | A1* | 6/2008 | Huntley .................. G07F 17/32 463/25 |
| 2008/0267502 | A1 | 10/2008 | Youngers et al. |
| 2008/0310721 | A1 | 12/2008 | Yang et al. |
| 2009/0185241 | A1 | 7/2009 | Nepomniachtchi |
| 2010/0151929 | A1 | 6/2010 | Oram et al. |
| 2010/0181755 | A1 | 7/2010 | Irwin, Jr. et al. |
| 2010/0222125 | A1 | 9/2010 | Nyman et al. |
| 2011/0091092 | A1 | 4/2011 | Nepomniachtchi et al. |
| 2012/0258781 | A1 | 10/2012 | Walker et al. |
| 2012/0270629 | A1 | 10/2012 | Chau |
| 2012/0292384 | A1 | 11/2012 | Wang et al. |
| 2012/0323708 | A1 | 12/2012 | Marinakis et al. |
| 2013/0202185 | A1 | 8/2013 | Irwin, Jr. et al. |

FOREIGN PATENT DOCUMENTS

| | | |
|---|---|---|
| WO | WO 2009/152185 A2 | 12/2009 |
| WO | WO 2013/118081 A1 | 8/2013 |

OTHER PUBLICATIONS

"AisleBuyer Raises Another $7.5 Million to Make Checkout Lines a Pain of the Past", Jason Kincaid, Jun. 13, 2011, http://techcrunch.com.

"Comment18inShare107Card. io's SDK Makes Entering Credit Card Information as Easy as Taking a Snapshot", Jason Kincaid, Jun. 23, 2011, http://techcrunch.com.

PCT Search Report, Oct. 19, 2015.

* cited by examiner

METHOD AND SYSTEM FOR PROVIDING ALTERNATIVE USAGES OF CLOSED LOTTERY NETWORKS

PRIORITY CLAIM

The present application claims priority to U.S. Provisional Application Ser. No. 62/030,283, filed Jul. 29, 2014, the entire disclosure of which is incorporated herein by reference in its entirety for all purposes.

FIELD OF THE INVENTION

The present invention relates to lottery networks that are typically installed within a lottery's jurisdiction and are normally closed to outside interfaces for security purposes. Specifically, the present invention provides secure methods of utilizing the normally closed lottery network and systems for other applications and forms of commerce.

BACKGROUND

Whenever a lottery is established in a jurisdiction (e.g. a state or other governmental entity), a closed network comprising special purpose lottery terminals, communications links, and central site system(s) are installed. In large jurisdictions, the costs of installing this system can be onerous. The closed lottery network/system is extensive with lottery terminals physically placed in every lottery retailer's place of business, a closed communications link (e.g., Virtual Private Network—VPN—over Internet connections, satellite connections, etc.), and a central site. This equipment and closed network/system is typically created, installed, and maintained by a lottery vendor at significant expense. In some lottery jurisdictions (e.g., Florida, New York, California, France, Pennsylvania, etc.), the number of field terminals and associated individual closed network connections can number in the tens of thousands. In fact, it is not unusual for lottery vendors to report a decline in revenue the next fiscal quarter or two after winning a major lottery system contract due to the substantial upfront investment required to manufacture and place the large number of lottery terminals in the field, as well as setup the network.

In addition to the significant costs to the lottery vendor, the lotteries themselves are also burdened with the size and complexity of the closed lottery network/system. Flattening sales curves for lottery products have caused lotteries to search for other forms of revenue, as well as attempting to negotiate smaller and smaller margins from lottery vendors. However, given the significant closed lottery system infrastructure costs, there are limits to the margin reductions offered by vendors.

Finally, lottery retailers themselves are complaining about the size and complexity of the closed lottery system. Retailers frequently complain about the counter space occupied by lottery equipment, product, and supplies as well as the labor-intensive handling of sales and redemptions. Given that retailer margins are typically much lower (i.e., around 5% to 6%) for lottery products than for other items, the retailer's complaints are not without merit.

Therefore, it is desirable to develop secure alternative usages for the closed lottery network/system for other applications. Given the ubiquitous presence of lottery terminals distributed throughout a jurisdiction, these other applications can be unique offering services or features not previously associated with lottery infrastructure. Ideally, these alternative applications could generate revenue for the lottery and/or lottery service provider thereby offsetting the closed network/system costs.

SUMMARY OF THE INVENTION

Objects and advantages of the invention will be set forth in part in the following description, or may be obvious from the description, or may be learned through practice of the invention.

Described are a number of system configurations and computing mechanisms that provide practical details for reliably producing secure alternative, revenue-generating, uses for closed lottery networks. These alternative mechanisms leverage the closed lottery network/system infrastructure (i.e., terminals, communications links, central site), while at the same time ensuring essential data isolation between the lottery and added transactions. This data isolation is critical, since it is generally a requirement of lotteries and associated lottery regulatory agencies (e.g., MUSL—Multi-State Lottery Association) that no outside entity can gain access to lottery transactions. Additionally, it is equally important that the data associated with any ancillary transaction utilizing the lottery network be protected in accordance with its associated requirements—e.g., PCI/DSS (Payment Card Industry/Digital Security Standard) compliance for debit or credit card transactions. In most cases, this would include ensuring that access to the ancillary data is protected from lottery operations personnel.

In a particular embodiment in accordance with aspects of the invention, a method and associated system are provided for processing lottery transactions and debit/credit transactions with lottery terminals that communicate with a lottery central site over a closed lottery network. The method includes conducting lottery transactions at the lottery terminals and transmitting lottery transaction data between the lottery terminals and the lottery central site. An interface is configured between the lottery central site and an acquiring processor that is external to the closed lottery network. Debit/credit purchase transactions are also conducted at the lottery terminals and debit/credit purchase transaction data is transmitted from the lottery terminals through the closed lottery network to the lottery central site. The debit/credit purchase transaction data is then transmitted from the lottery central site to the acquiring processor via the interface. During the various lottery and debit/credit purchase transactions, the debit/credit purchase transaction data and lottery purchase transaction data are isolated throughout the closed lottery network.

The method/system may further comprise configuring the lottery terminals with a respective debit/credit card processing device, such as a card reader that is used by the consumer or clerk. The lottery terminal and the debit/credit card processing device may access the closed lottery network via a common switch such that encrypted data between the acquiring processor and the debit/credit card processing device is transmitted through the common switch and bypasses the lottery terminal. This embodiment may further include modifying firewall rules at the lottery central cite to accept Internet addresses associated with the debit/credit card processing device and the acquiring processor.

A further embodiment may include establishing a direct communication link between the lottery terminal and the debit/credit card processing device for printing debit/credit transaction documents at the lottery terminal.

Another embodiment may include establishing a direct communication link between the lottery terminal and the acquiring processor for printing debit/credit transaction documents at the lottery terminal.

The method/system may include modifying firewall rules at the lottery terminals so as to only allow throughput of debit/credit purchase transaction data flagged with a specific Internet address for the acquiring processor.

Another embodiment may include configuring the lottery terminals with a respective debit/credit card processing device, and establishing a direct communication link between the lottery terminal and the debit/credit card processing device such that encrypted data between the acquiring processor and the debit/credit card processing device is transmitted through the lottery terminal.

The debit/credit purchase transaction data may be transmitted as encrypted data packets with an address flag that identifies the acquiring processor and is readable by the lottery central site such that essentially the only processing done by the lottery central site on the data packet is to read the address flag and relay the data packet to the acquiring processor.

In alternative method/system embodiments in accordance with aspects of the invention, the lottery transactions are conducted with other types of ancillary non-lottery transactions at the lottery terminals. These ancillary service transactions may include, for example, activation of closed or open loop gift cards; payment of bills, including utility bills; money transmission to a specified recipient, and so forth. Lottery transactions are conducted at the lottery terminals and lottery transaction data is transmitted between the lottery terminals and the lottery central site. An interface is configured between the lottery central site and an ancillary service processor that is external to the closed lottery network. Ancillary service transactions are conducted at the lottery terminals and ancillary service transaction data is transmitted from the lottery terminals through the closed lottery network to the lottery central site. The ancillary service transaction data is then transmitted from the lottery central site to the ancillary service processor via the interface. During the various lottery and ancillary service transactions, confidential or sensitive data associated with the ancillary service transaction data (e.g. account data) and the lottery purchase transaction data are isolated throughout the closed lottery network.

In a particular embodiment, the ancillary service is a gift card transaction wherein a gift card is presented to the lottery terminal, and the ancillary service processor is associated with the gift card issuer. The gift card has proxy data thereon in the form of a code or serial number that is readable by the lottery terminal and links the gift card to an account at the issuer processor. The proxy data and gift card transaction data are transmitted through the lottery central site to the issuer processor such that essentially the only processing done by lottery central site is to read the proxy data and relay the gift card transaction data to the issuer processor. Sensitive or confidential data associated with the particular account is never accessible by the lottery network.

DETAILED DESCRIPTION

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations come within the scope and spirit of the invention.

Establishing revenue generating ancillary uses for closed lottery networks principally requires ensuring integrity and secrecy of the data for each type of use. At one level, this integrity and secrecy protection/isolation is provided to ensure compliance with whatever regulatory specifications are applicable to the specific usage—e.g., MUSL (Multi-State Lottery Association) for lottery usage, PCI/DSS (Payment Card Industry/Digital Security Standard) for debit/credit cards, etc. At another level, it is essential for any network to maintain the confidence of its users by providing assurances that each type of user is transmitting and receiving their data in a secure manner that ensures integrity.

In the special case of closed lottery networks, assurances of secrecy and integrity have been well established for their normal function of selling and redeeming lottery products and services. However, when it comes to leveraging this closed network for other uses, the question of the lottery network's integrity may arise due to its tight integration with its primary purpose (i.e., lottery) and therefore not suitable for other usages. Additionally, with varying regulatory groups from different industries imposing different requirements and audits onto the same system, there may be conflicting requirements that are incompatible with other industry requirements.

The overall method to ensure maximum availability of a closed lottery network/system for other uses is to provide as much isolation as possible between the various usages. This isolation can take the form of physical (i.e., separate hardware for each use sharing the common network plumbing), logical (e.g., different encryption keys over different channels within the network), and proxy (i.e., transmitting/receiving over the lottery network in clear text with substitute data that only has relevance to the intended user). The remainder of this specification will provide practical details of how this isolation can be achieved on the backbone of typical closed lottery networks and systems.

Figure 1:
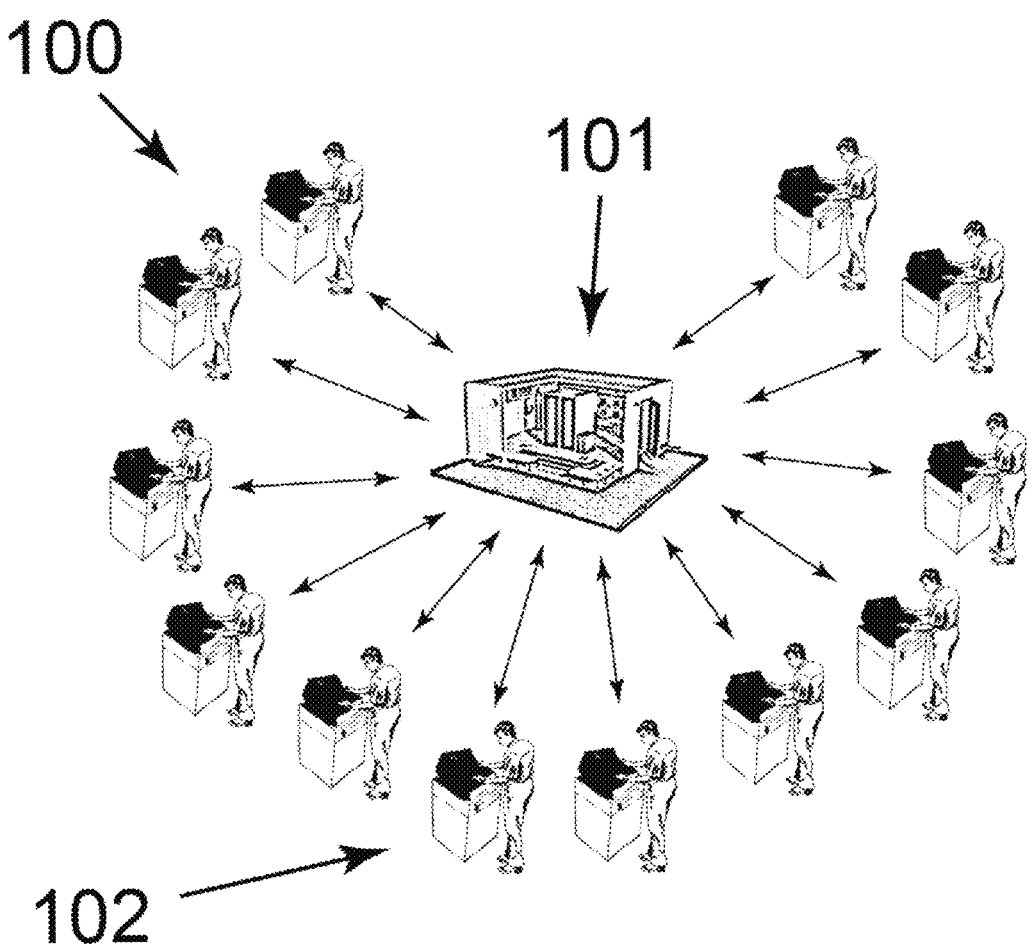
FIG. 1 is a block diagram providing a graphical overview of a typical closed lottery network.

FIG. 1 illustrates the general configuration of a typical closed lottery network 100. As shown in the figure, in a typical closed lottery network there are multiple lottery terminals 102 (twelve illustrated in FIG. 1) at different retailer locations all connected via a private network to a lottery central site 101. The exact nature of the private network will vary per lottery and even per retailer location within the same jurisdiction, as is well known to those skilled in the art. In some cases, the private network may be various radio frequency links via satellite to the central site 101. In other cases, the public Internet may be employed as the plumbing for the closed lottery network with the private aspect being maintained through encrypted channels between the retailer terminals 102 and the central site 101 (e.g., Virtual Private Network—VPN—tunnel). However, in all cases the lottery network integrity and confidentiality is ensured via data encryption and multifaceted authentication.

Figure 2:
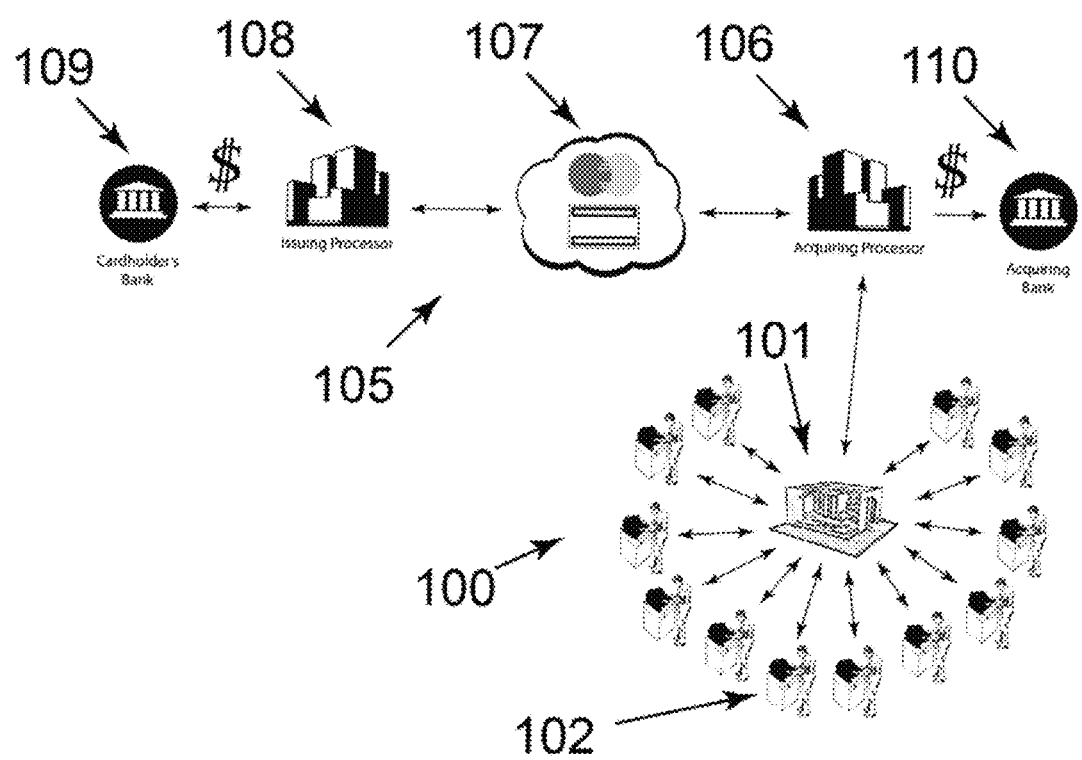
FIG. 2 is a block diagram providing a graphical overview of interfacing the debit/credit interchange to the closed lottery network of FIG. 1.

FIG. 2 illustrates the same closed lottery network with an additional interface/use 105 that allows it to process debit or credit cards. In FIG. 2, a new external interface is established between the lottery central site 101 and an acquiring processor 106. In this embodiment, debit or credit card transactions are accepted by lottery retailers 102 and forwarded through the closed lottery network and central site 101 to the acquiring processor 106. The acquiring processor 106 then analyses the debit/credit card account number for the pending transaction to determine the correct routing and forwards the pending transaction through the interchange 107 to the debit/credit card's issuing processor 108 and ultimately the cardholder's issuing bank 109. The bank 109 then (assuming sufficient funds are available in the cardholder's account) approves the pending transaction, routing the approval back through the issuing processor 108 and the interchange 107 to the acquiring processor 106 that issued the original transaction request from the lottery network 100. The acquiring processor 106 would then reply to the lottery central site 101 that the transaction has been approved, with the payment approval message sent back through the closed lottery network 100 to the retailer 102 that initiated the payment request. As a back office function associated with the transaction, the issuing bank 109 would also route the payment funds to the acquiring bank 110 and ultimately the retailer's bank account minus the merchant's discount. Thus, in this embodiment, the existing closed lottery network 100 and debit/credit interchange 105 are linked together to provide a homogenized debit/credit processing embodiment for lottery retailers.

The advantages of this homogenized embodiment of FIG. 2 are numerous. Debit/credit card fees (a.k.a. merchant discount) vary with respect to the issuing bank/processor, the risk level of the Merchant Category Code (MCC) transmitted by the acquiring processor for the merchant, and the volume of transactions that the merchant processes over a given time period (e.g., annually). By consolidating all lottery retailer debit/credit card transactions through the homogenized embodiment of the closed lottery network 100 and the interchange 105, the sum total of all of the lottery retailer's transactions (as opposed to each retailer individually) are applied to the rate the acquiring processor 106 charges the merchant resulting in significant high volume discounts for all merchants on the closed lottery network 100 regardless of the sales volume of any individual retailer. Additionally, a common, low risk, MCC would be applied for all debit/credit transactions originating on the closed lottery network further increasing retailer savings. Thus, the sales costs to all participating lottery retailers are reduced, thereby encouraging retailers to carry lottery products.

If in addition to lottery sales, all of the retailer's debit/credit card transactions (i.e., in store sales in addition to lottery products) were conducted through this same homogenized network portal, the cost of sale for all debit/credit card transactions to the retailer would drop significantly, while at the same time further increasing the aggregate volume to the acquiring processor and thereby further reducing rates.

In addition to reduced costs of sales for lottery and retailers, the homogenized embodiment of FIG. 2 also has the advantage of optionally enabling lotteries to pay the merchant discount (i.e., interchange transaction fees) on sales of lottery products. Lottery retailers typically receive a commission of 5% to 6% of the retail sales price of lottery products, which is substantially less than the commission received for the sale of other goods in their stores. Generally, this lower rate of commission is begrudgingly accepted by lottery retailers in exchange for the perceived increase in foot traffic through their stores brought about by the sale of lottery products. However, because of the low commission structure, lottery retailers are hesitant to accept debit or (when permitted by law) credit cards as a form of payment for lottery products with merchant discount fees (i.e., the amount that is withheld from the retail price quoted to the consumer by the debit/credit card association when paying the selling merchant) potentially approaching 3% to 4%. Thus, lottery products tend to be exclusively cash based. It is theorized that this lack of debit/credit card acceptance for lottery products is hampering lottery sales. By processing debit/credit card transactions through the combined closed lottery network 100 and debit/credit interchange 105 portal, it would be a simple matter for the lottery to monitor the lottery related transactions and reimburse the retailers for any merchant discount fee applied to lottery transitions. As illustrated in FIG. 2, this reimbursement could occur after the funds are pushed from the issuing/card holder's bank 109 to the acquiring bank account 110 sans merchant discount. The lottery would then simply pull the funds from the acquiring bank 110, add back the amount previously deleted as a merchant discount from its own account, and push the resulting sum to the appropriate lottery retailer's bank account.

Figure 3:
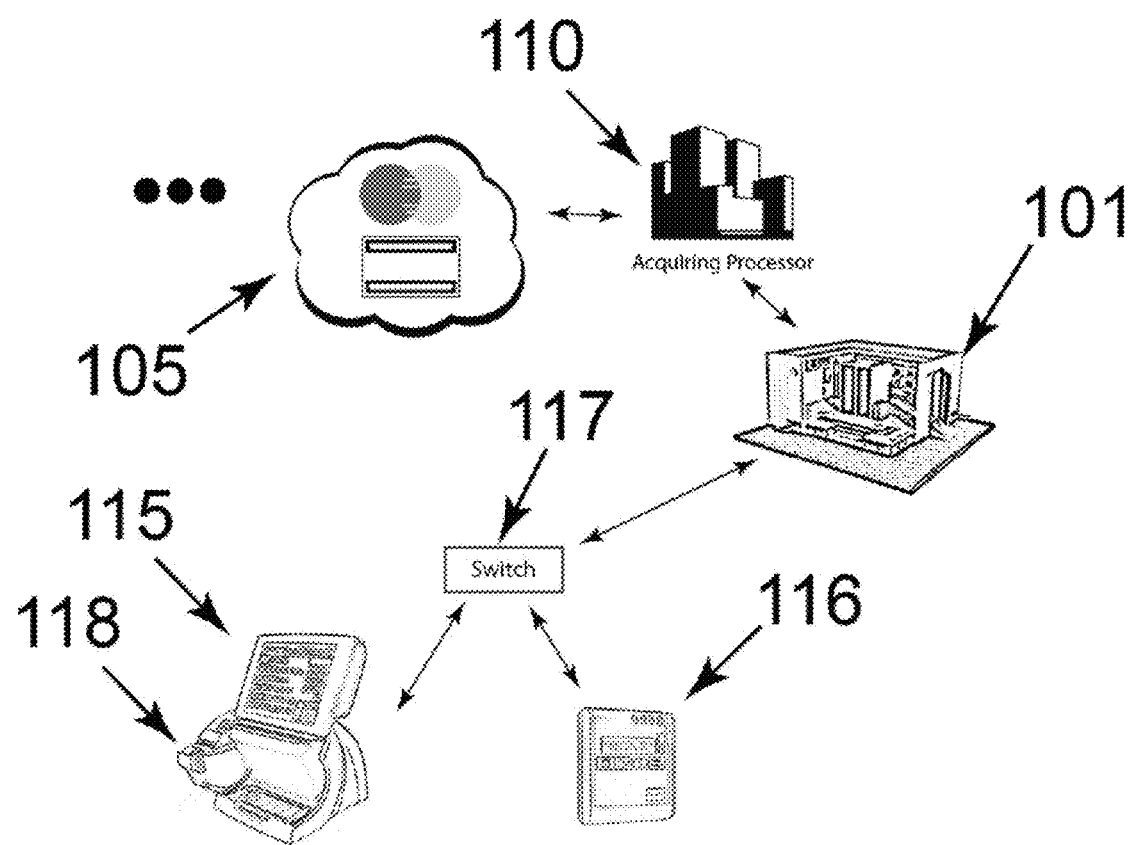
FIG. 3 is a block diagram providing a graphical overview of interfacing a lottery terminal and debit/credit card processing machine in parallel to the lottery central site of FIG. 1 and subsequently the debit/credit interchange of FIG. 2.

As a practical matter, the details of implementing the homogenized embodiment of FIG. 2 require ensuring that the debit/credit card data and the direct lottery transaction data are completely isolated. This is due to differing requirements for lottery systems and debit/credit card systems imposed by regulators. FIG. 3 illustrates one possible embodiment that achieves this required isolation. In FIG. 3 the lottery retailer terminal station (102 as illustrated in FIG. 2) is magnified to illustrate the individual components of the lottery retailer terminal 115, including a lottery printer 118, and a consumer facing debit/credit card interface 116 and an Ethernet switch 117, that allow the two discreet devices interfacing to the network (i.e., lottery terminal 115 and debit/credit card processor 116) to share the same network communications portal to the lottery central site 101. In this embodiment, functional data isolation is achieved by employing different hardware for each use (i.e., lottery terminal 115 for lottery related transactions and debit/credit card processing terminal 116 for debit/credit related transactions), with the two isolated devices establishing their own TCP/IP or UDP/IP (Transmission Control Protocol/Internet Protocol or User Datagram Protocol/Internet Protocol) links over the lottery network. Isolation is achieved with each device (115 and 116) establishing its own discreet encrypted communications link with its own secret encryption key to its own central site host. In a preferred embodiment, these encrypted links would be established with at least one device establishing a Virtual Private Network (VPN) to its central site host. However, the required isolation and authentication would still be achieved even if each device only encrypted its sensitive data and left its overhead communications controls in plaintext.

In embodiments where the lottery network piggybacks on standard Internet interfaces (e.g., DSL—Digital Subscriber Line—modem), the routing of the lottery terminal 115 could be directly to the lottery central site 101 via the switch 117 and the routing of the debit/credit card data from the debit/credit processing terminal 116 could be through switch 117 and then directly to the acquiring processor 110 and debit/credit interchange 105. In embodiments where the lottery network is closed via specialized communications links (e.g., satellite where a satellite hub typically aggregates the communications from the lottery retailer terminals 102—FIG. 2—to the lottery central site 101—FIG. 3—via a VPN), the lottery terminal 115 would connect to the lottery central site 101 via its normal communications path with the addition of switch 117 and the debit/credit processing terminal 116 would relay through the lottery central site 101 to the acquiring processor 110 and interchange 105. In this embodiment, the lottery central site's 101 firewall rules would be modified to include in its white list (i.e., the fixed Internet addresses allowed to communicate with the lottery central site 101) the Internet addresses associated with the acquiring processor 110 and debit/credit card processing terminals 116.

The above described embodiment has the advantage of simplicity of installation with the debit/credit processing terminal 116 and switch 117 being added to each lottery retailer 102 (FIG. 2) location and the lottery terminal 105 (FIG. 3) and central site 101 interface remaining, for the most part, unaffected. However, this embodiment has the high potential cost of implementation due to debit/credit terminal 116 hardware. For example, if physical signatures were to be captured as part of the debit or credit transaction, debit/credit terminal 116 would require its own discreet printer. Aside from the added cost of the debit/credit terminal 116 printer, which is not insignificant when viewed that the added cost would be multiplied times the number of lottery retailer locations in a jurisdiction, there are also the logistical problems associated with stocking and loading the paper required for the debit/credit terminal 116 printer to be considered. Of course, an interface could be designed wherein the debit/credit terminal 116 or acquiring processor 110 could communicate directly with lottery terminal 105 via TCP/IP or UDP/IP to utilize its printer 118 for printing any required debit/credit documents. However, this interface would be complex in nature with the debit/credit terminal 116 and/or acquiring processor 110 and lottery terminal 115 being cognizant of each other's Internet addresses, requiring authentication on all inter-device/site communications, establishing custom error handling protocols, etc.

Figure 4:
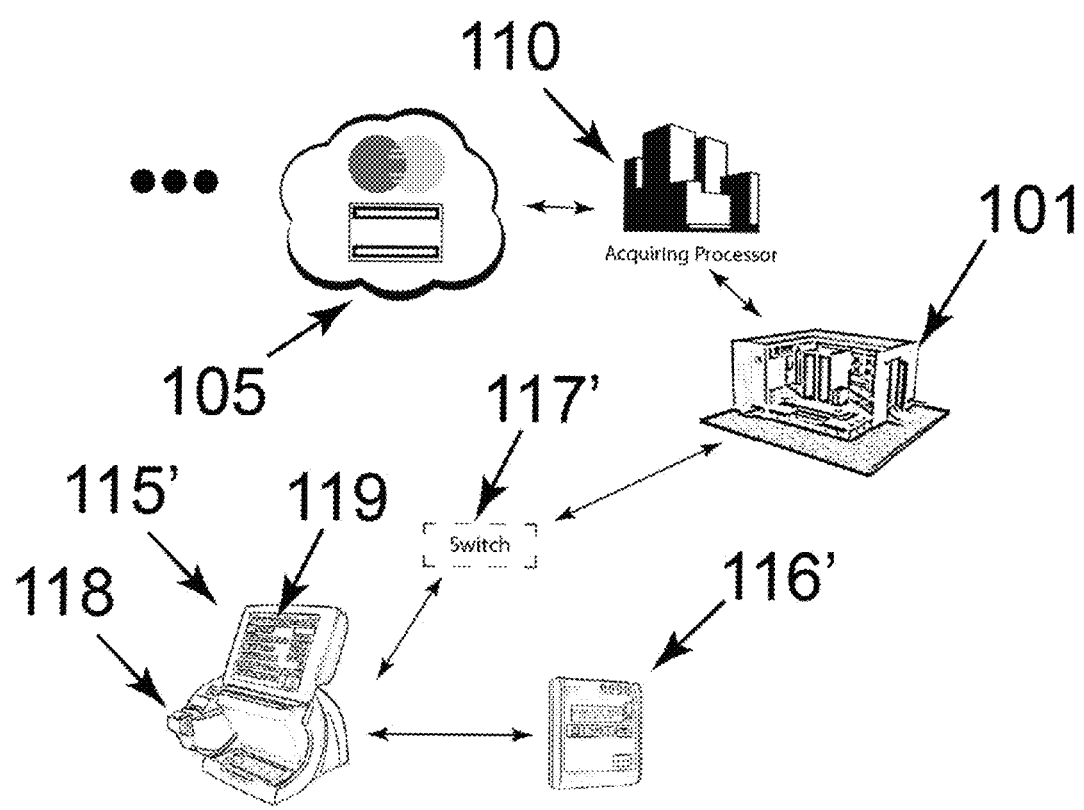
FIG. 4 is a block diagram providing a graphical overview of interfacing a lottery terminal and debit/credit card processing machine in series to the lottery central site of FIG. 1 and subsequently the debit/credit interchange of FIG. 2.

In the embodiment of FIG. 4, the debit/credit terminal 116' is interfaced to the lottery terminal 115' rather than directly to the lottery network via switch 117. The exact nature of the debit/credit terminal 116' to lottery terminal 115' interface (e.g., TCP/IP, UDP/IP, USB—Universal Serial Bus) is significant. The concept is that the debit/credit terminal 116' is interfaced to the lottery terminal 115' over a direct link or a closed Local Area Network (LAN) to allow both the debit/credit terminal 116' to communicate commands/telemetry to/from the lottery terminal 115' or to request that lottery terminal 115' relay encrypted data packets to the acquiring processor 110. As in a previous embodiment, the lottery central site's 101 firewall rules would be modified in this embodiment to include in its white list the Internet address associated with the acquiring processor 110; however, the Internet address associated with the debit/credit processor 116' would not be required.

When relaying data packets to the acquiring processor 110, the lottery terminal 115' simply receives a block of encrypted data with a forwarding address/flag from the debit/credit terminal 116'. The lottery terminal 115' then relays the encrypted data packet(s) through the (now) optional switch 117' to the lottery central site 101. The central site's 101 Communications Front End (CFE) then detects the encrypted data packet's clear text address/flag and forwards the packet to the acquiring processor 110 for decryption and processing via the banking interchange 105. By encrypting the debit/credit card sensitive data and encapsulating it in a packet with cleartext address destinations and or flags, the lottery terminal 115' and central site 101 can be utilized as part of the card validation network without having to comply with the debit/credit card industry's onerous PCI/DSS requirements and associated certification process.

The debit/credit card subsystem comprised of debit/credit terminals 116' and acquiring processor 110 would be controlled by presumably a well known debit/credit processing company and therefore could be viewed as a trusted source communicating through the lottery network. This is not to imply that the security of the lottery network is solely reliant on the debit/credit card company's integrity, rather the architecture of the encrypted packet not only protects the integrity/security of PCI/DSS data, it also protects the lottery network components. Since the encrypted PCI/DSS data is encapsulated in a packet with a predefined cleartext destination address and/or flag, there is no detailed processing performed on the encrypted data itself thereby greatly reducing the threat of malware being introduced into the lottery network by forwarding of the debit/credit card transactions. Indeed, since there is no direct processing (i.e., only data relaying) performed on the encrypted PCI/DSS data packet itself, the main realistic potential threat to the lottery network from an insider attack from the debit/credit validation system would be some sort of buffer overflow attack with a lottery component—e.g., lottery terminal 115', central site 101 CFE, etc. Fortunately, as a general rule, testing for these types of attacks is relatively straightforward and consequently ensuring that the lottery system is hardened against these types of attacks can be achieved with a relatively high level of confidence.

In this embodiment, aside from communicating with the acquiring processor 101 thru the lottery terminal 115', the debit/credit terminal 116' also communicates directly with the lottery terminal 115' itself. Both commands and telemetry are exchanged between the two devices with the lottery terminal 115' commanding the debit/credit terminal 116' that a transaction in the amount of $X is pending payment via debit/credit card. Once the debit/credit terminal 116' processes the payment, the device 116' can then command the lottery terminal 115' to print a receipt documenting the completed transaction with its printer 118. In the special case of signature debit/credit, the lottery terminal printer 118 may be required to print transactions where the retailer may be required to keep a copy of the customer's signature; therefore, two copies of the receipt would be printed—i.e., one for the consumer and one for the retailer's records. Alternatively, the debit/credit terminal 116' could print one receipt for the consumer and digitally capture the customer's signature sending the digital image to the acquiring processor 101 for storage and freeing the retailer of any requirement to keep the customer's signature on file.

Most of the above paragraph describes interactions between the debit/credit terminal 116' and the lottery terminal 115' that are already well known in the art of Point Of Sale (POS) cash registers communicating with debit/credit processors. The unique requirements of ensuring the integrity and security of both the debit/credit terminal 116' data from intrusion by the lottery terminal 115'/network for PCI/DSS compliance and at the same time protecting the lottery terminal 115' from intrusion from the debit/credit terminal 116' for compliance with lottery regulations (e.g., MUSL) poses unique implementations that have not been previously considered. Thus, to ensure the integrity and security of both the debit/credit terminal 116' and the lottery terminal 115', both sides of the interface must be hardened against possible attacks. Additionally, in the unique implementation of leveraging lottery terminals 115' and the associated closed lottery network for other usages, there are two discreet interface types required: the first interface transmitting encrypted PCI data through the lottery terminal 115', closed lottery network, and the lottery central site 101 CFE to the acquiring processor 110 and interchange 105. The second interface offering command, control, and telemetry to/from the lottery terminal 115' devices (e.g., printer 118, touchscreen control panel 119, etc.) and the debit/credit terminal 116'. With both types of interfaces, it is essential that the lottery terminal 115' maintain a virtual firewall between its inner lottery transaction memory and the debit/credit terminal 116' and acquiring processor 110 data. In one embodiment, this virtual firewall could take the practical form of only allowing commands/telemetry to/from the debit/credit terminal 116' via authentication (e.g., specified Internet addresses, specific Friend or Foe protocol, etc.) and a fixed (i.e., application limited, non-operating system level) set of commands that execute exclusively in their own lottery terminal memory sandbox (i.e., allocated memory). For enabling the interface between the debit/credit terminal 116' and the acquiring processor 110, a preferred embodiment would ensure that the lottery terminal 115' virtual firewall would only allow throughput communications to/from the acquiring processor's specified Internet address and the debit/credit terminal 116' and possibly a limited number of alternative Internet addresses for failover or maintenance purposes. Additionally, as previously described, throughput encrypted PCI data packets would include cleartext addresses and/or flags that would be known a priori to the lottery terminal 115'.

The embodiment of FIG. 4 has the disadvantage of greater complexity than the previous embodiment of FIG. 3. However, the reduction in cost in the embodiment of FIG. 4 associated with sharing hardware and logistical supplies, as well as a presumably simpler user interface for the retailer, tend to outweigh the increased software and network complexity.

Figure 5:
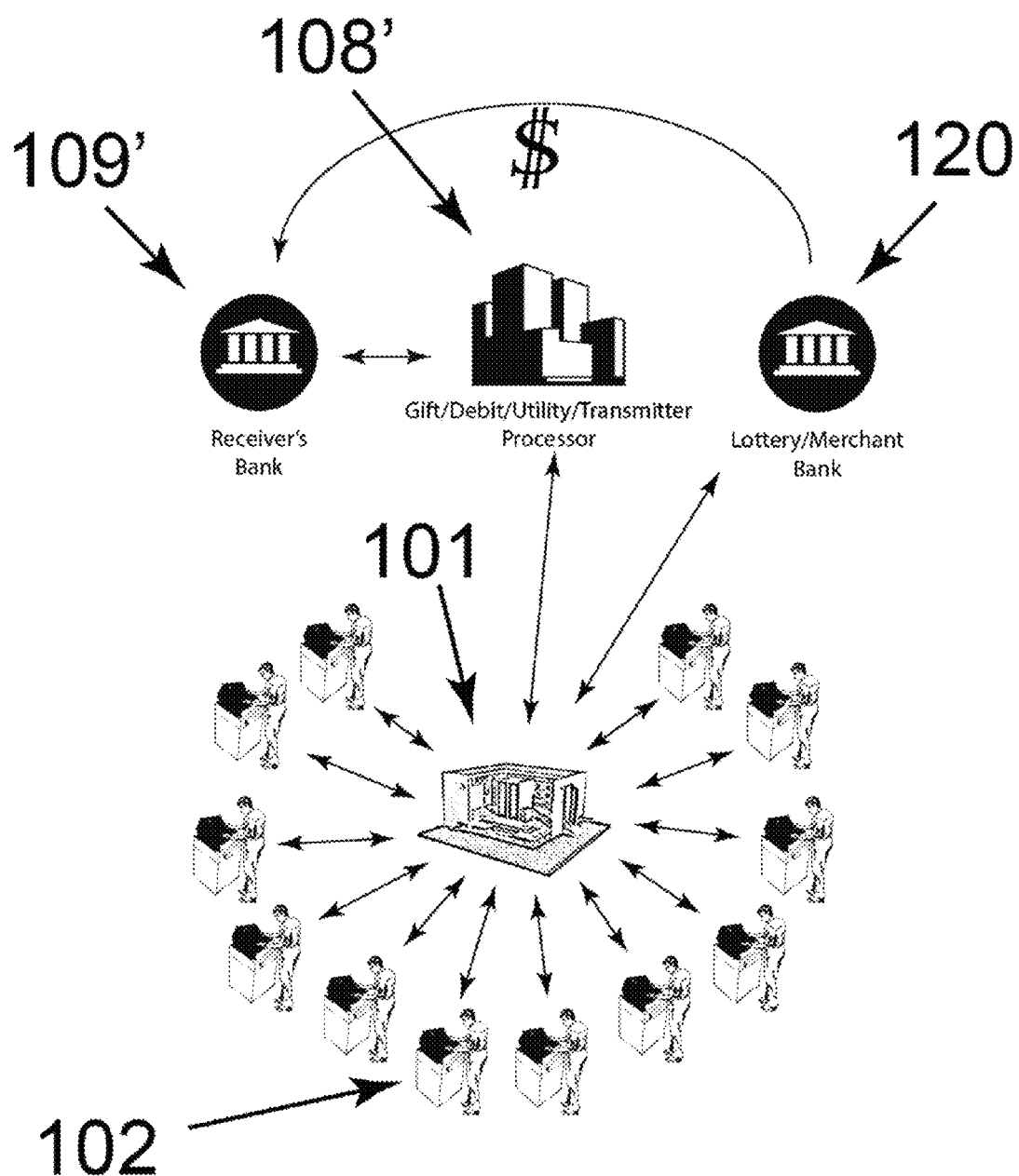
FIG. 5 is a block diagram providing a graphical overview of interfacing a gift/debit/utility/transmitter system to the closed lottery network of FIG. 1; and, FIG. 6 is a drawing illustrating a debit card suitable for loading a variable amount of funds via the closed lottery network and central site of FIG. 1.

Aside from debit/credit processing, a lottery network can be employed for other ancillary uses such as: the activation of closed/open loop gift cards, payment of bills (e.g., utilities), or money transmission. FIG. 5 illustrates one possible embodiment enabling all of the aforementioned functionality. As before, in FIG. 5 there are multiple lottery retailers 102 connected by a lottery network to a lottery central site 101. However, in this embodiment the ancillary usage requires connecting the lottery central site 101 and associated network to another special purpose system 108' other than a debit/credit card system. As implied in FIG. 5, there are multiplicities of special services system 108' that can perform various transactional functions, including: gift card activation, utility or other bill payment, money transmission, etc. However, in most cases of this embodiment, the funds that the consumer pays for the special purpose are paid to the lottery retailer 102 in the form of either cash or debit/credit with the associated funds minus the retailer's commission for processing the transaction first deposited in the lottery retailer's bank account 120 and then pulled/pushed by/to the special purpose institution bank account 109'.

In these types of embodiments, no external special purpose hardware (e.g., PCI/DSS complaint debit/credit processor 116 and 116' of FIG. 3 and FIG. 4) is required; rather the lottery terminal itself performs all required hardware functionality with the special purpose functionality achieved by software independent of the main lottery terminal application. Security isolation in these embodiments is achieved by either communicating proxy data and/or operating the special software program for the ancillary function(s) in its own memory space or sandbox. In the context of this invention, proxy data is a serial number or other type of unique data that is digitally linked to sensitive data (e.g., PCI/DSS account number on a gift card) where the link to the sensitive data and the sensitive data itself is known/stored only on the special purpose system.

In one particular embodiment of FIG. 5, the lottery retailer terminals 102, network, and central site 101 can be linked to a closed/open loop gift card issuer 108' by communicating proxy data from a barcode 132 (FIG. 6) on the gift card itself 130/130' or its secure packaging that is linked (by the issuer) to the gift card's account number. The exact nature of the gift card could be closed loop (i.e., only payable at a specified institution), open loop (i.e., payable wherever the indicated associated is accepted), or open loop lottery gift card used as a cashless method of paying out winning prizes to consumers. In the last case, the lottery gift card would (lost likely) be branded with the lottery's logo and optionally allow for winnings to be loaded on the gift card—thereby allowing retailers to easily pay out larger lottery prizes.

In the special case of an open loop gift/lottery card 130, the account number 133 would be subjected to PCI/DSS security regulation. However, since the retailer lottery terminal 102 (FIG. 5), network, and central site 101 only process the proxy data from the barcode 132 (FIG. 6) associated with the gift card 133 account with no knowledge of the link to the actual account number 133 or the data embedded in the card's magnetic stripe 131, no further data isolation is required to ensure that the lottery system does not have to be complaint with PCI/DSS. Furthermore, only proxy data is relayed through the lottery system with no computational processing, other than perhaps verifying a check digit or CRC (Cyclic Redundancy Check) embedded in the barcode. Therefore, in this embodiment, the need to isolate the lottery system 101 to maintain lottery industry regulation compliance is limited to the interface between the lottery central site 101 (FIG. 5) and the gift card issuer 108'. As previously discussed, this isolation can be achieved via an encrypted/authenticated link between the lottery central site 101 and the issuer for the gift card 108', a white listing of the gift card issuer's 108' Internet address in the lottery central site firewall, and optionally a VPN established between the two lottery 101 and issuer 108' sites.

Figure 6:
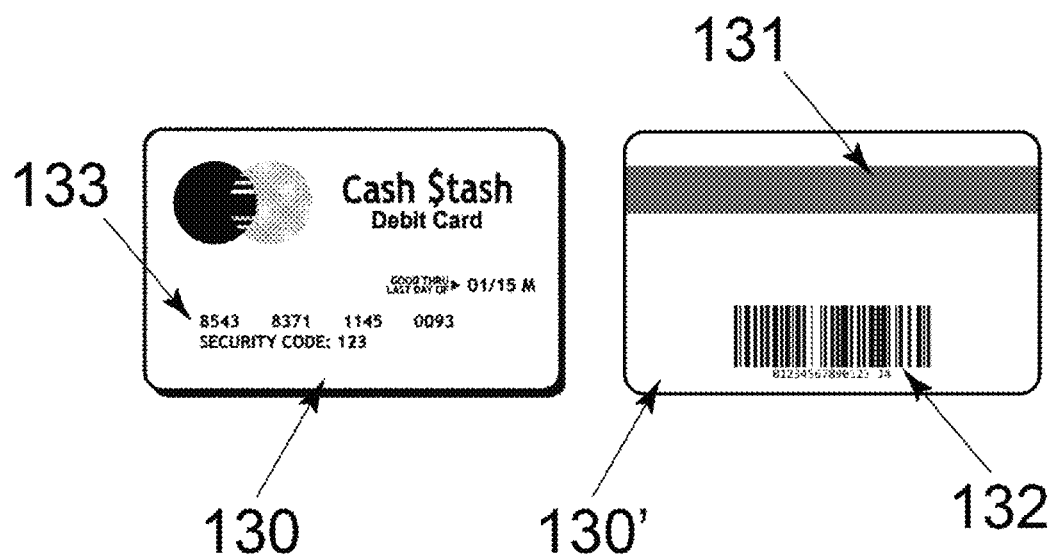

In another embodiment of FIG. 6, the proxy number 132 embedded in the barcode of the open loop gift/lottery card or general purpose debit/credit card 130/130' can be used for purchases of lottery products without the need to have additional PCI/DSS compatible hardware or the lottery terminals 102 (FIG. 5) and associated network and central site 101 to become PCI/DSS compliant. In this embodiment, a lottery payment would be processed by transmitting only the proxy number to the issuing processor 108', where the issuing processor would link the received proxy to the actual account number 133 (FIG. 6), determine if sufficient funds were available for the payment, and if so authorize payment to the lottery terminal. Again, since the card's 130/130' magnetic stripe 131 was not swiped or the account number 133 was never entered into the lottery system, there is no need for the lottery system to be PCI/DSS compliant. This embodiment has the advantage of no additional hardware cost at the lottery retailers 102 (FIG. 5), as well as providing a method of possibly avoiding/reducing interchange or merchant discount payments. The disadvantage may exist of only accepting cards 130/133' with special proxy barcodes 132, as well as maintaining a direct link between the lottery central site 101 (FIG. 6) and the issuer of the card 108'. As a practical matter, this particular embodiment may be of most value when lotteries issue their own branded gift debit cards and/or award prizes on said cards.

In another embodiment of FIG. 5, the lottery retailer terminals 102, network, and central site 101 can be linked to an institution 108' that normally bills and receives periodic payments form consumers—e.g., utilities. In this embodiment, a proxy barcode serial number could be scanned from the bill itself with the embodied data transmitted to the billing institution 108'. As before, the proxy data would be utilized by the billing institution to identify the billed account, with the transfer of proxy information from the lottery central site 101 to the billing institution generating an indication that the bill has been paid to the lottery retailer. The lottery retailer would then deposit the funds from the bill payment into their bank account with the funds, minus the retailer's commission, pulled from the retailer's bank account some predefined time period later—e.g., two days. In an alternative embodiment where there is no sensitive information on the bill itself, the entire bill may be scanned by the lottery terminal's document scanner with the collected digital data transmitted to the billing institution.

Again, since the lottery terminal 102, network, and central site 101 processes the proxy data from a barcode or the bill image contains no sensitive data, there is no need to isolate the bill data itself from the lottery system. Furthermore, since only data is relayed through the lottery system with no computational processing other than perhaps verifying a check digit or CRC embedded in a barcode or possibly performing Optical Character Recognition (OCR) on the scanned bill image, the need to isolate the lottery system 101 to maintain lottery industry regulation compliance is limited to the interface between the lottery central site 101 (FIG. 5) and the billing institution 108'. As previously discussed, this isolation can be achieved via an encrypted/authenticated link between the lottery central site 101 and the billing institution 108', a white listing of the billing institution's 108' Internet address in the lottery central site firewall, and optionally a VPN established between the two sites.

In yet another embodiment of FIG. 5, the lottery retailer terminals 102, network, and central site 101 can be linked to an institution 108' that normally transmits money for consumers—e.g., Western Union. In this embodiment, the retailer would register receiving the funds to be transmitted on the lottery terminal 102, with the lottery network and central site 101 relaying the receipt to the money transmitter 108'. In this embodiment, the retailer lottery terminal screen would have a special menu for money transmission allowing the retailer to specify the intended general destination where the money will be received (e.g., country/state), the amount to be transmitted, and other relevant information. The lottery terminal screen will also display the fee (including retailer commission) associated with transmitting the funds. When the money transfer information and receipt have been received by the money transmitter 108', the acknowledgement will be relayed back through the lottery central site 101 to the retailer terminal 102. At this point, there are multiple embodiments possible for printing the consumer's receipt.

In one embodiment, the normal money transmitter authorization code will be transmitted to the terminal along with any authentication information for the receiver. In this embodiment, it is desirable for the sensitive receipt information to be transmitted to the lottery terminal 102 encrypted with a decryption key known only to the lottery terminal and not the central site. The decryption key administration being managed by special software running in its own sandbox on the lottery terminal. Ideally, encryption key management will be automatic and periodically updated with unique keys for each lottery terminal—e.g., different asymmetrical keys assigned to each lottery terminal used to transmit/receive daily encrypted symmetrical keys.

In another embodiment, the money transmitter authorization code may be unique for lottery terminal applications to provide further isolation of money transmitter data from the lottery system. An example of this type of code might be all or a portion (e.g., 64-bits) of a secure hash (e.g., Secure Hash Algorithm 2 or SHA-2) that is derived at the terminal by hashing the entered transaction data, data received from the money transmitter, and a pseudorandomly selected or given by the purchaser Personal Identification Number (PIN) printed on the ticket with the resulting hash being sent back to the money transmitter. In this embodiment, when the recipient attempts to claim the transmitted funds, the same PIN will be required such that the money transmitter terminal at the other end can recalculate and compare the two hashes. Assuming the hashes (i.e., the lottery terminal transmitted hash and the calculated hash) are identical the transfer would be approved.

In still another embodiment, when the money transfer has been received by the money transmitter 108', the money transmitter 108' or lottery central site 101 will select a serial number and associated PIN from a special lottery instant ticket database that is compatible with the lottery system in operation where the money is to be transmitted. The concept being that any lottery retailer at the receiving location could complete the money transfer by entering the special instant ticket serial number and associated PIN into its lottery terminal as an instant ticket transaction. The lottery central site at the receiving end of the money transfer would then look up the special instant ticket serial number in the virtual instant ticket database reserved for money transfers, and assuming the special instant ticket serial number and PIN are valid and have not been previously redeemed, would authorize payment of the amount associated with the serial number as a winning instant lottery transaction. This embodiment has the advantage of enabling money transfers between any two lotteries participating in money transmission and does not require special hardware at either the transmitter or receiving lottery retailer, as well as not requiring special software at the receiving lottery. The only requirement is that the receiving lottery maintains a virtual instant ticket database on its central site. A disadvantage of this embodiment is that the amount of money transmitted must be in increments that are available in the virtual instant ticket database.

What is claimed is:

1. A method for processing lottery transactions and debit/credit transactions with lottery terminals that communicate with a lottery central site over a closed lottery network, the method comprising:
conducting lottery transactions at the lottery terminals and transmitting lottery transaction data between the lottery terminals and the lottery central site;
configuring an interface between the lottery central site and an acquiring processor that is external to the closed lottery network;
conducting debit/credit purchase transactions at the lottery terminals and transmitting debit/credit purchase transaction data from the lottery terminals through the closed lottery network to the lottery central site;
transmitting the debit/credit purchase transaction data from the lottery central site to the acquiring processor via the interface;
maintaining the debit/credit purchase transaction data and lottery purchase transaction data isolated throughout the closed lottery network; and
configuring the lottery terminals with a respective debit/credit card processing device, the lottery terminal and the debit/credit card processing device accessing the closed lottery network via a common switch, each of the lottery terminal and the debit/credit card processing device separately generating and transmitting encrypted data with separate respective encryption keys, wherein the encrypted data from the debit/credit card processing device bypasses the lottery terminal and is transmitted through the common switch to the closed lottery network and lottery central site, and through the interface to the acquiring processor.

2. The method as in claim 1, further comprising modifying firewall rules at the lottery central cite to accept Internet addresses associated with the debit/credit card processing device and the acquiring processor.

3. The method as in claim 1, further comprising establishing a direct communication link between the lottery terminal and the debit/credit card processing device for printing debit/credit transaction documents at the lottery terminal.

4. The method as in claim 1, further comprising establishing a direct communication link between the lottery terminal and the acquiring processor for printing debit/credit transaction documents at the lottery terminal.

5. The method as in claim 1, further comprising modifying firewall rules at the lottery terminals so as to only allow throughput of debit/credit purchase transaction data flagged with a specific Internet address for the acquiring processor.

6. The method as in claim 1, further comprising configuring the lottery terminals with a respective debit/credit card processing device, and establishing a direct communication link between the lottery terminal and the debit/credit card processing device such that encrypted data between the acquiring processor and the debit/credit card processing device is transmitted through the lottery terminal.

7. The method as in claim 1, wherein the debit/credit purchase transaction data is transmitted as encrypted data packets with an address flag that identifies the acquiring processor and is readable by the lottery central site such that essentially the only processing done by lottery central site on the data packet is to read the address flag and relay the data packet to the acquiring processor.

8. A method for processing lottery transactions and ancillary non-lottery transactions with lottery terminals that communicate with a lottery central site over a closed lottery network, the method comprising:
conducting lottery transactions at the lottery terminals and transmitting lottery transaction data between the lottery terminals and the lottery central site;
configuring an interface between the lottery central site and an ancillary service processor that is external to the closed lottery network;
conducting ancillary service transactions at the lottery terminals and transmitting ancillary service transaction data from the lottery terminals through the closed lottery network to the lottery central site;
transmitting the ancillary service transaction data from the lottery central site to the ancillary service processor via the interface; and
maintaining the ancillary service transaction data and lottery purchase transaction data isolated throughout the closed lottery network; and
configuring the lottery terminals with a respective debit/credit card processing device, the lottery terminal and the debit/credit card processing device accessing the closed lottery network via a common switch, each of the lottery terminal and the debit/credit card processing device separately generating and transmitting encrypted data with separate respective encryption keys, wherein the encrypted data from the debit/credit card processing device related to the ancillary service transactions bypasses the lottery terminal and is transmitted through the common switch to the closed lottery network and lottery central site, and through the interface to the ancillary service processor.

9. The method as in claim 8, wherein the ancillary service is one of: activation of closed or open loop gift cards; payment of bills, including utility bills; money transmission to a recipient.

10. The method as in claim 8, wherein the ancillary service is a gift card transaction wherein a gift card is presented to the lottery terminal, the ancillary service processor associated with the gift card issuer, the gift card having proxy data thereon in the form of a code or serial number that is readable by the lottery terminal and links the gift card to an account at the ancillary processor, wherein the proxy data and gift card transaction data are transmitted through the lottery central site to the ancillary processor such that essentially the only processing done by lottery central site is to read the proxy data and relay the gift card transaction data to the ancillary processor.

* * * * *